United States Patent [19]

Sarakinis

[11] Patent Number: 5,647,222
[45] Date of Patent: Jul. 15, 1997

[54] METHOD AND DEVICE FOR DIAGNOSIS OF THE REFRIGERANT QUANTITY IN AN AIR CONDITIONING SYSTEM

[75] Inventor: Georgios Sarakinis, Hisings Backa, Sweden

[73] Assignee: AB Volvo, Sweden

[21] Appl. No.: 416,802

[22] PCT Filed: Oct. 18, 1993

[86] PCT No.: PCT/SE93/00848

§ 371 Date: Apr. 13, 1995

§ 102(e) Date: Apr. 13, 1995

[87] PCT Pub. No.: WO94/08809

PCT Pub. Date: Apr. 28, 1994

[30] Foreign Application Priority Data

Oct. 16, 1992 [SE] Sweden ................................. 9203039

[51] Int. Cl.[6] ........................................... B60H 1/32
[52] U.S. Cl. ....................................... 62/129; 62/126
[58] Field of Search ........................... 62/125, 126, 127, 62/129

[56] References Cited

U.S. PATENT DOCUMENTS

| | | | |
|---|---|---|---|
| 4,167,858 | 9/1979 | Kojima et al. | 62/129 X |
| 4,220,010 | 9/1980 | Mueller et al. | 62/126 |
| 4,677,830 | 7/1987 | Sumikawa et al. | |
| 5,239,865 | 8/1993 | Salzer et al. | 62/129 X |
| 5,241,833 | 9/1993 | Ohkoshi | 62/126 |

*Primary Examiner*—Harry B. Tanner
*Attorney, Agent, or Firm*—Lerner, David, Littenberg, Krumholz & Mentlik

[57] ABSTRACT

A method for diagnosis of the refrigerant quantity in an air conditioning system in which an evaporator (10) followed by a liquid-separating accumulator (11), a compressor (12), a condensor (13), and a shut-off device (14) are connected in series after one another in a closed circuit for circulation of a refrigerant. The pressure of the refrigerant is measured between the condensor (13) and the shut-off device (14). The temperature of the refrigerant is measured after the compressor (12) and also before the evaporator (10). The measured values are compared with stored set values, for determining whether the refrigerant quantity is within, or outside, a reference interval.

4 Claims, 4 Drawing Sheets

1

METHOD AND DEVICE FOR DIAGNOSIS OF THE REFRIGERANT QUANTITY IN AN AIR CONDITIONING SYSTEM

TECHNICAL FIELD

The present invention relates to a method and a device for diagnosis of the refrigerant quantity in an air conditioning system, in which an evaporator followed by a liquid-separating accumulator, a compressor, a condensor, and a shut-off device are connected in series after one another in a closed circuit for circulation of a refrigerant.

BACKGROUND OF THE INVENTION

Air conditioning systems in vehicles must normally be able to function in greatly varying conditions, for instance regarding ambient temperature and atmospheric humidity. Also, its function depends on the quantity of refrigerant in the closed system.

The most common cause of malfunctions in air conditioning systems is a too high or too low refrigerant quantity. A small leakage in an air conditioning system can be very difficult to discover. If the compressor, over a very long period of time, is forced to function with a too low refrigerant quantity, it might break down.

Even a slight shortage of refrigerant can lead to the following negative consequences:

low undercooling after the condensor, high overheating after the evaporator, the evaporation pressure is lower than normal, and the output temperature of the compressor is higher than normal.

An excess of refrigerant might, on the other hand, lead to the following negative consequences:

high undercooling after the condensor, the condensing pressure is higher than normal, the output temperature of the compressor is lower than normal, the evaporation pressure is higher than normal, and the overheating after the evaporator is low.

In practice, a shortage as well as an excess of the refrigerant will force the compressor to work more often and during longer time periods than what otherwise would have been necessary.

Up to now, no suitable devices have existed for measuring the refrigerant quantity in a closed system with capillary tubes as a shut-off means, and with a liquid-separating accumulator after the evaporator. For this reason, service and maintenance of cars equipped with air conditioning systems usually mean that the liquid must be evacuated from the system when measuring the quantity of the refrigerant. This evacuation is time consuming, since the system comprises rather long fluid lines with narrow passages. Draining and filling of the refrigerant also lead to risks of discharging substances which are harmful to the environment.

U.S. Pat. No. 4,757,693 describes an air conditioning system with an electronic circuit for detection of malfunctions, for example due to an inaccurate refrigerant quantity. This air conditioning system is however equipped with a tank for the refrigerant between the condensor and the expansion valve. U.S. 4,308,725 describes a detector for indicating the level of the refrigerant in such a storage tank.

SUMMARY OF THE INVENTION

Consequently, a purpose of the present invention is to provide a method and a device for a quick and simple diagnosis of the refrigerant quantity in an air conditioning system which does not have a tank for the refrigerant.

This object is solved in the method according to the invention in that the pressure of the refrigerant is measured between the condensor and the shut-off device, that the temperature of the refrigerant is measured after the compressor and also before the evaporator, and that the measured values are compared with stored set values for determining whether the refrigerant quantity is within, or outside, a reference interval. The device according to the invention is characterized by pressure sensing means for detecting the refrigerant pressure between the condensor and the shut-off device, temperature sensing means for detecting the refrigerant temperature after the compressor and before the evaporator respectively, and by an analysis unit which is arranged to compare input data from the pressure sensing and the temperature sensing means with stored set values.

Advantageous embodiments of the invention will be apparent from the subsequent dependent claims.

BRIEF DESCRIPTION OF THE DRAWINGS

Embodiments of the invention will now be described in greater detail with reference to the accompanying drawings, wherein FIG. 1 schematically shows an air conditioning system with a diagnosis system, according to a first embodiment of the invention.

DETAILED DESCRIPTION OF PREFERRED EMBODIMENTS

Figure 1:
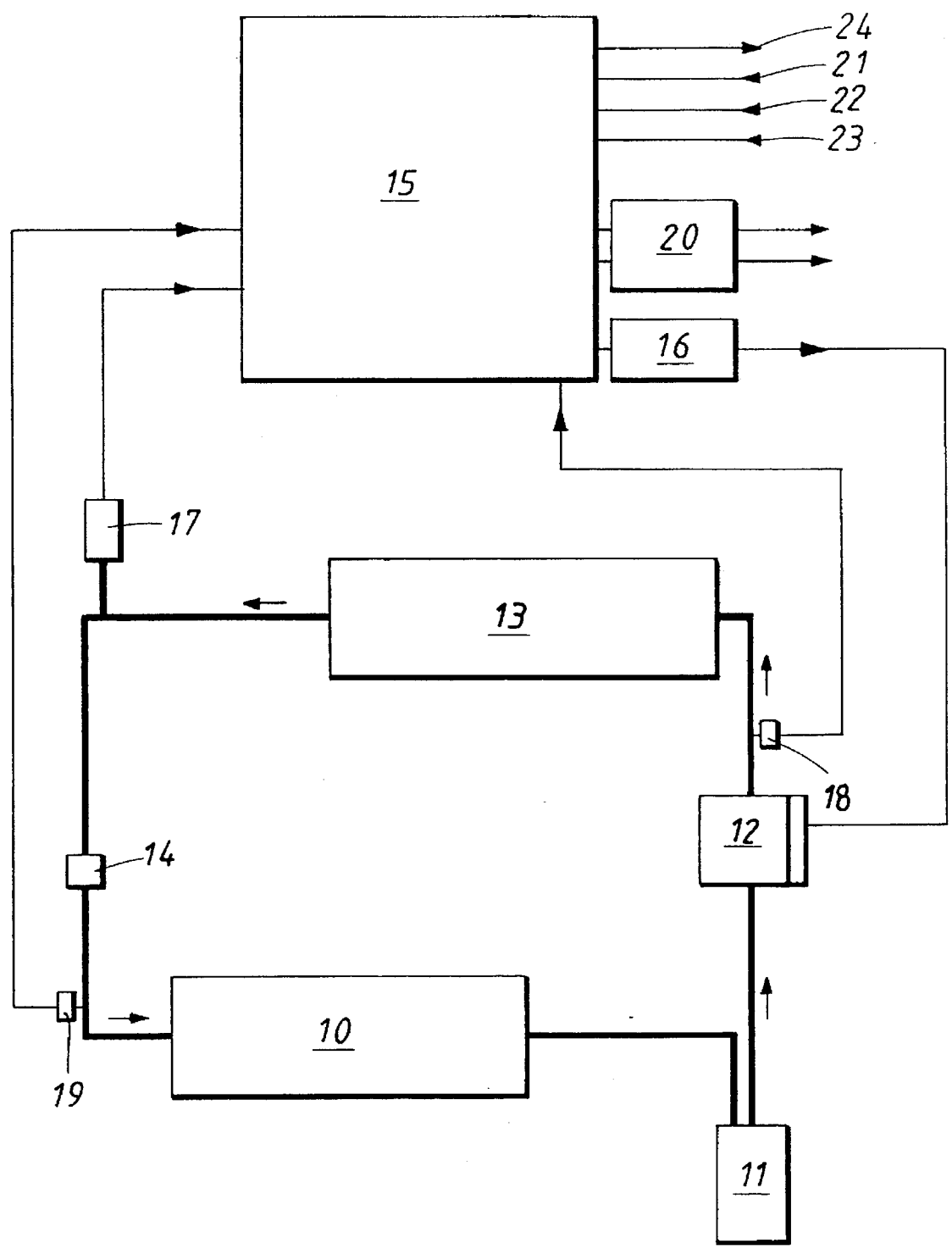
Figure 2:
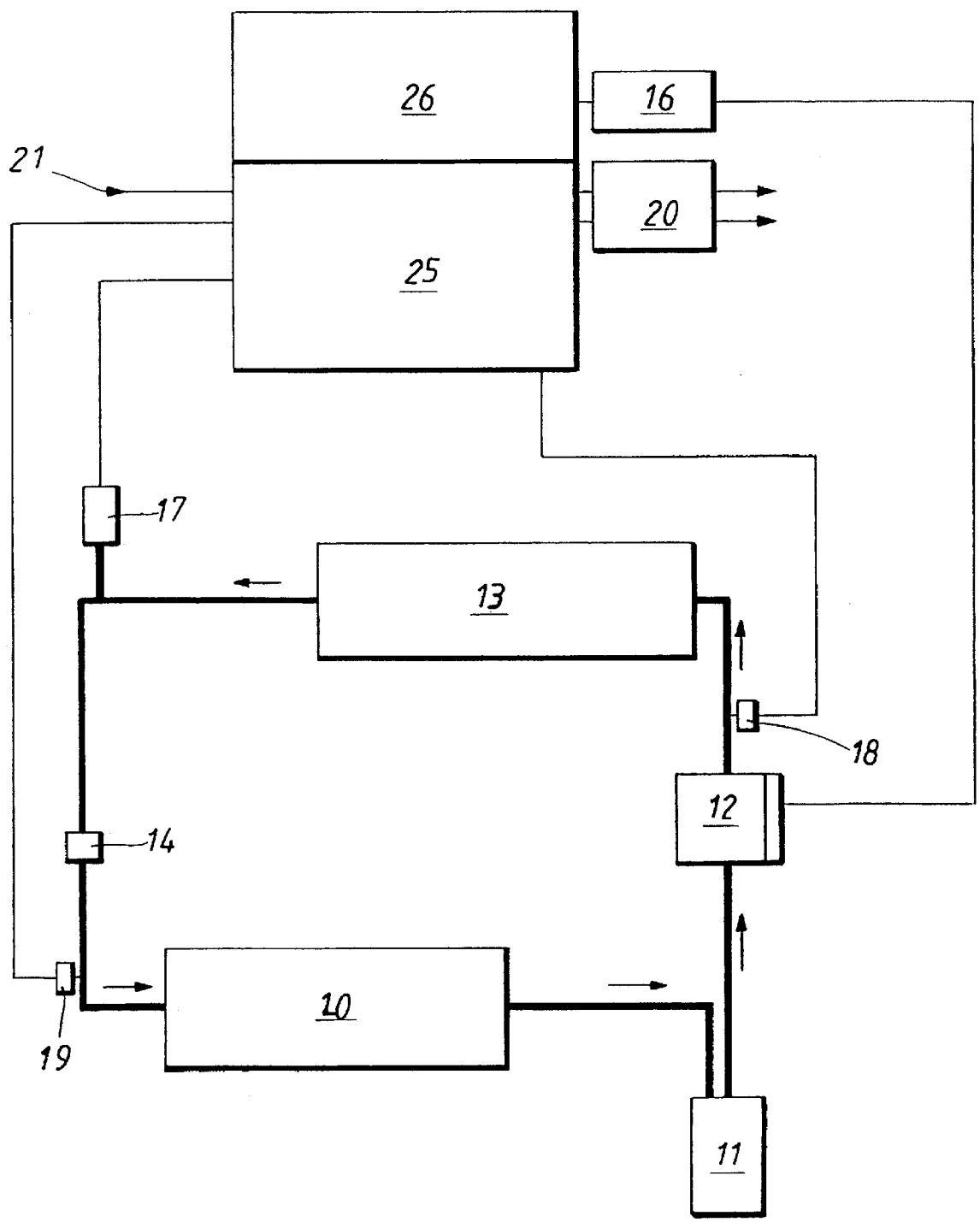
FIG. 2 shows in an analogous way a diagnosis system according to a second embodiment of the invention.

The air conditioning system shown in FIGS. 1 and 2 comprises an evaporator 10 with a following liquid-separating accumulator 11, a compressor 12, a condensor 13 and a shut-off device 14 which are connected in series after one another in a closed circuit for the circulation of a refrigerant.

According to a first embodiment of the invention which is shown in FIG. 1, a separate monitoring unit 15 is connected to the air conditioning system by means of a control relay 16 for controlling the compressor 12, and also through a pressure-sensing means 17 for detection of the refrigerant pressure $P_{17}$ between the condensor 13 and the shut-off device 14. Furthermore, the monitoring unit is provided with temperature-sensing means 18, 19 for detection of the refrigerant temperature $T_{18}$ after the compressor 12 and the refrigerant temperature before the evaporator 10, respectively.

Measurements from the pressure sensor 17 are used for deriving corresponding temperature values $T_{P17}$. This correspondence is based on known thermodynamic relationships providing the temperature values as a function of the condenser pressure. A database, i.e. a table comprising a set of such corresponding temperature pressure values, is stored in the monitoring unit 15 for providing this conversion operation.

The monitoring unit 15 controls the half-speed mode and the full-speed mode of the compartment fan by means of a dual relay 20. In addition to this, the unit 15 receives input signals regarding the operation of the engine via an engine speed sensor 21, regarding the on/off-condition via a sensor 22, and information regarding the compartment fan by a sensor 23.

The unit 15 is arranged to compare input data from the pressure-sensing and temperature-sensing means 17–19 with stored set values, whereby deviations from these values will result in a warning indication by means of a warning light 24 on the dashboard of the vehicle.

In the preferred embodiment, the above-mentioned temperature and pressure values are used to calculate a numerical value for use in this comparison, according to the following equation:

$$(T_{18}-T_{19})/(T_{P17}-T_{19})$$

in which $T_{18}$ is the temperature measured by the first temperature sensor 18, $T_{19}$ is the temperature measured by the second temperature sensor 19 and $T_{P17}$ is the temperature corresponding to the pressure value measured by the pressure sensor 17. This equation gives a relatively complete picture of the overall conditions of the entire air conditioning system, i.e. both upstream and downstream of the condenser 13. Also, it provides measurements which are essentially independent of external influence. Other equations taking account of the pressure and temperature measurements could, of course, also be used.

FIG. 2 shows an alternative embodiment of the invention in which a monitoring unit 25 is integrated with an automatic air conditioning system for performing periodical control of the compressor 12 and automatic shut-off at a low refrigerant quantity, in the same manner as the previously described embodiment. Functionally, this embodiment differs from the previous one in that information regarding the ambient temperature and the engine temperature is available and may be used for a timer-controlled start of the compressor as well as for a more accurate diagnosis of the switched-off state.

Figure 3:
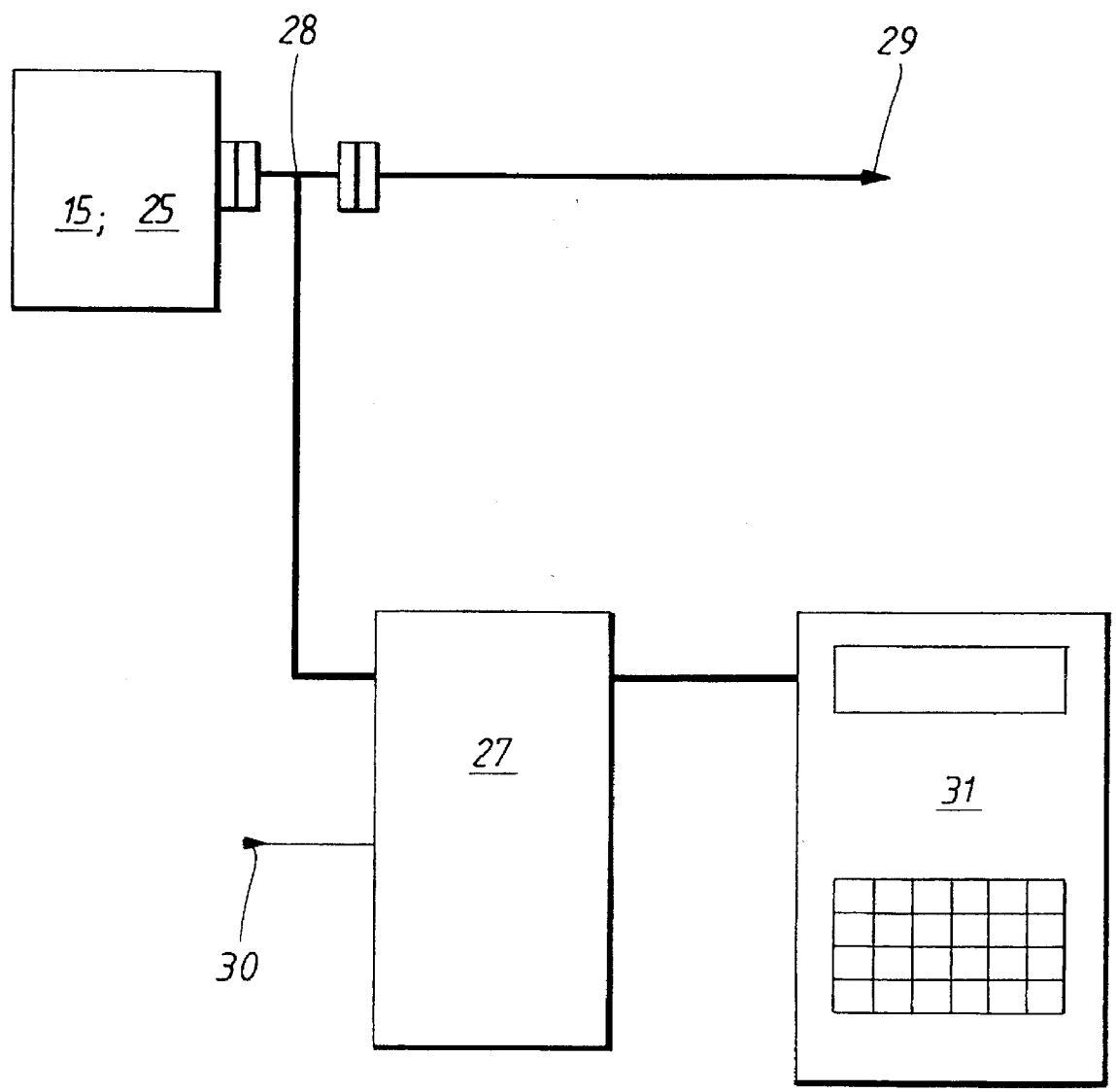
FIG. 3 shows a diagnosis system suitable for use in workshops.

FIG. 3 shows a diagnosis unit 27 intented for use in a workshop, comprising a T-connection 28 which is mounted between the ordinary connection of the vehicle's cabling 29 and the diagnosis unit 15; 25. A temperature sensor 30 is manually fitted at a suitable location between the evaporator 10 and the accumulator 11. The value of the ambient temperature is entered in the diagnosis instrument 31. The diagnosis is made while idling and with the compartment fan at full speed.

Figure 4:
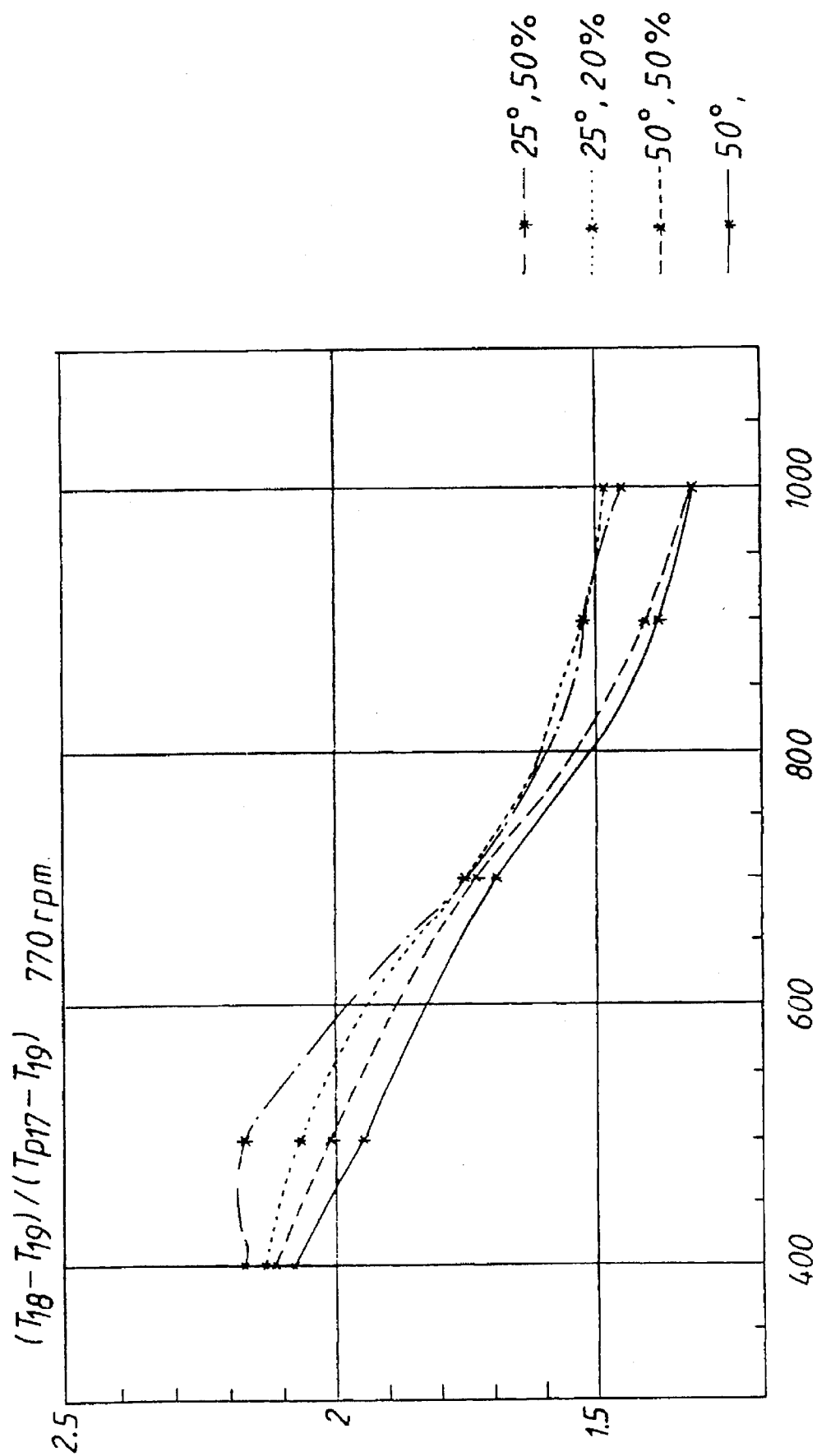
FIG. 4 is a diagram which shows the quantity of refrigerant in a system as a function of the ambient temperature and the atmospheric humidity.

From the diagram shown in FIG. 4, it is apparent how the rise in temperature of the compressor in relation to the rise in pressure of the compressor depends on the refrigerant quantity. This relationship can be expressed as a function of the difference between the condensing temperature and the evaporator temperature. The Y-axis of the diagram is based on the temperature after the compressor, the temperature before the evaporator and the difference between the saturation temperature corresponding to the pressure after the condenser and the temperature before the evaporator. Specifically, the Y-axis represents values of the function $(T_{18}-T_{19})/(T_{P17}-T_{19})$, and the X-axis represents experimentally measured refrigerant quantity, in grams, at various values of that function. Four graphs display various operation conditions with respect to the ambient temperature and the atmospheric humidity.

The monitoring unit 15 determines refrigerant quantity from values of $T_{P17}$, $T_{18}$ and $T_{19}$ by using a table of predetermined values representing the graphs of FIG. 4 stored in memory. A value of $$(T_{18}-T_{19})/(T_{P17}-T_{19})$$

is first calculated from the measured values, and a refrigerant quantity is then determined using the stored table. In accordance with that data, a specific value of the refrigerant quantity can thus be derived by following a graph corresponding to the particular operating conditions. For example, a value of 2 which is calculated by means of said equation corresponds to a refrigerant quantity of approximately 520 grams (assuming a temperature of 50°), as shown in FIG. 4.

Underfilling leads to increasing overheating, causing an increased inlet temperature to the compressor and thereby also an increased output temperature.

If overfilled, an overboiling in the evaporator occurs, which leads to drops of liquid entering the compressor. This results in a decrease of the output temperature due to the cooling effect of the liquid.

The invention is not limited to the abovementioned embodiments, but other variations are also possible within the scope of the following claims.

I claim:

1. A method for determining the quantity of refrigerant in an air conditioning system comprising a closed circuit for circulating said refrigerant sequentially through an evaporator, a liquid-separating accumulator, a compressor, a condenser, and shut-off means, said method including measuring the pressure of said refrigerant between said condenser and said shut-off means, measuring the temperature of said refrigerant downstream of said compressor, measuring the temperature of said refrigerant upstream of said evaporator, and comparing said measured values of said pressure and temperature of said refrigerant with predetermined values therefor in order to determine whether said quantity of said refrigerant falls within a predetermined reference interval.

2. Apparatus for determining the quantity of refrigerant in an air conditioning system comprising a closed circuit for circulating said refrigerant sequentially through an evaporator, a liquid-separating accumulator, a compressor, a condenser, and shut-off means, said apparatus including pressure sensing means for determining the pressure of said refrigerant between said condenser and said shut-off means, temperature sensing means for measuring the temperature of said refrigerant downstream of said compressor, temperature sensing means for measuring the temperature of said refrigerant and upstream of said evaporator, and analyzing means for comparing said measured values of said pressure and temperature of said refrigerant with predetermined values therefor in order to determine whether said quantity of said refrigerant falls within a predetermined reference interval.

3. The apparatus of claim 2 wherein said analyzing means is integrated with an automatic air conditioning system.

4. A method for determining the quantity of refrigerant in an air conditioning system comprising a closed circuit for circulating said refrigerant sequentially through an evaporator, a liquid-separating accumulator, a compressor, a condenser, and shut-off means, said method including measuring the pressure of said refrigerant between said condenser and said shut-off means, measuring the temperature of said refrigerant downstream of said compressor, measuring the temperature of said refrigerant upstream of said evaporator, computing the difference between said temperature of said refrigerant downstream of said compressor and said temperature of said refrigerant upstream of said evaporator divided by the difference between a temperature of said refrigerant corresponding to said pressure of said refrigerant between said condenser and said shut-off means, and said temperature of said refrigerant upstream of said evaporator, deriving a value from a result of said computing step, said value corresponding to an actual refrigerant quantity, and comparing said value with a predetermined value in order to determine whether said quantity of said refrigerant falls within a predetermined reference interval.

* * * * *

UNITED STATES PATENT AND TRADEMARK OFFICE
CERTIFICATE OF CORRECTION

PATENT NO. : 5,647,222
DATED : July 15, 1997
INVENTOR(S) : Sarakinis

It is certified that error appears in the above-identified patent and that said Letters Patent is hereby corrected as shown below:

Throughout the patent change "condensor" to --condenser--.

Column 2, line 55, after "temperature" insert --$T_{19}$--.

Column 2, line 63, "temperature pressure" should read --temperature/pressure--.

Column 4, line 55, after "erant" delete the word --and--.

Signed and Sealed this

Thirteenth Day of January, 1998

Attest:

BRUCE LEHMAN

Attesting Officer

Commissioner of Patents and Trademarks